United States Patent Office 2,725,956
Patented Dec. 6, 1955

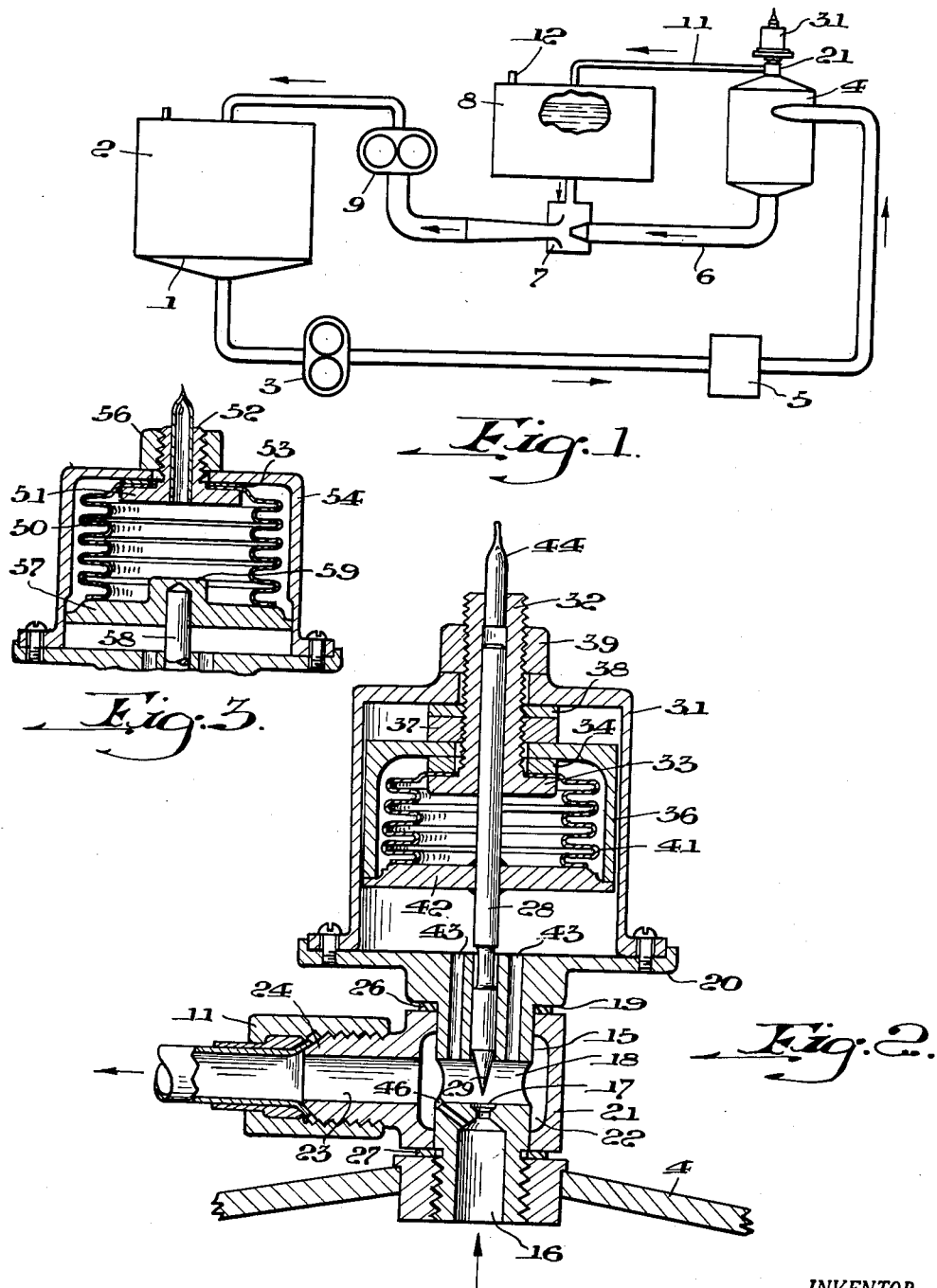

2,725,956

AIRCRAFT ENGINE LUBRICATION SYSTEM

Richard G. Cunningham, State College, Pa., assignor, by mesne assignments, to Research Corporation, New York, N. Y., a corporation of New York Application January 7, 1954, Serial No. 402,653

3 Claims. (Cl. 184—6)

This invention relates to lubrication systems for aircraft engines, and more particularly to the deaerators used in closed-circuit systems.

In a closed-circuit lubrication system, lubricating oil from the sump of the engine is pumped by a scavenge pump into a deaerator, where the oil and entrained air are separated, the air being vented at the top of the deaerator and the oil returned to the engine. To insure removal of air, the deaerator vent is made of a size that will permit a small quantity of oil to escape with the air. This oil which accompanies the air is called "oil drag." The air and oil drag are delivered to an oil reservoir which has a vent for escape of the air from the deaerator. The main body of oil leaving the bottom of the deaerator passes through an eductor on its way to the pressure pump that pumps the oil into the engine. The bottom of the reservoir is connected with the side inlet of the eductor so that oil from the reservoir will be drawn into the eductor to make up for the lost oil or oil drag and for any oil lost through leakage, evaporation, etc. Oil discharges from the eductor to the pressure pump at a pressure above ambient, the difference being the amount that the pressure is boosted by the scavenge pump to pressurize the inlet of the pressure pump. This is important, because without this pressure boost at the inlet of the pressure pump produced by the scavenge pump, the ambient pressure at high altitudes may be too low to force sufficient oil from the reservoir to the pressure pump to fill it, thereby resulting in a reduced rate of flow of oil.

The need for a deaerator arises from the fact that air is entrained by the scavenge pump as a result of the over capacity of that pump compared to the pressure pump. As the aircraft flies higher, the decrease in the density of the air with the ambient pressure reduces the mass rate of flow of air in the lubricating system, an unfortunate result of which is a corresponding rise in the oil drag rate. It follows that the eductor is burdened with the highest oil make-up rates at high altitudes, just where maximum boost pressure is needed to maintain full flow of oil at the pressure pump. To help remedy this situation, the size of the deaerator vent has been a compromise between a large area which is desirable for a large oil drag rate at sea level, and a small area for low drag rates which are desirable at high altitudes because the boost pressure at the pressure pump decreases in proportion to the pumping load on the eductor. Consequently, in the past the lubrication system has operated efficiently only at intermediate altitudes, with not enough oil drag at low altitude for good deaeration and too much oil drag at high altitude for good pump operation.

It is among the objects of this invention to provide an aircraft engine oil circulation system which operates efficiently at all altitudes, which has improved deaeration at low altitude and improved boost pressure for the pressure pump at high altitudes, and which can use a more efficient eductor than heretofore. Another object is to provide a deaerator vent valve which can readily be added to present oil deaerators, which is small and uncomplicated in construction, and which will not cause serious trouble in flight if it fails to operate.

In accordance with this invention the aircraft engine lubrication system includes an oil sump, means for pumping oil from the sump to a deaerator, an oil reservoir, means for returning oil from the deaerator and reservoir to the engine, and a deaerator vent valve through which air and oil drag are conducted to the reservoir. The valve is provided with a normally open passage through it, a throttling valve member for the passage, and means responsive to a reduction in atmospheric pressure for moving the valve member toward passage-closing position. Consequently, as the plane rises into higher altitudes, the valve is closed more and more to reduce the oil drag rate. It is desirable to provide the valve with a by-pass around its seat so that air can flow through the valve at a limited rate even if it is closed. The valve member preferably is operated by a bellows that expands and contracts with changes in the surrounding atmospheric pressure.

The invention is illustrated in the accompanying drawings, in which:

Fig. 1 is a diagram of my oil circulation system;

Fig. 2 is an enlarged central vertical section through the deaerator vent valve; and Fig. 3 is a fragmentary view, similar to Fig. 2, of another embodiment of the valve.

Referring to Fig. 1 of the drawings, lubricating oil from the sump 1 of an aircraft engine 2 is withdrawn by one or more scavenge pumps 3 and pumped into a deaerator 4 of any suitable construction. An oil cooler 5 is placed at a suitable location in the line, such as between the pump and deaerator. The deaerated oil leaves the bottom of the deaerator through a pipe 6 which leads to the inlet nozzle of an eductor 7. The pressure created by the scavenge pump therefore operates the eductor. The side or induction inlet of the eductor is connected with the outlet of an oil reservoir 8, in which the oil is under atmospheric pressure, meaning the pressure of the surrounding atmosphere at any altitude where the aircraft happens to be. The outlet of the eductor is connected with the inlet of one or more pressure pumps 9, which pump the deaerated oil back into the engine to lubricate its moving parts.

The air separated from the oil in the deaerator leaves it through a vent in its top and is conducted through a pipe 11 to the top of the oil reservoir, from which it can escape to the atmosphere through a vent 12. In order to be sure that all of the air is being conducted away from the deaerator, a small percentage of oil always is withdrawn with it. At low altitudes a higher percentage of oil drag rate is necessary than at high altitudes for efficient operation of the deaerator. The oil in the reservoir therefore consists of make-up oil and oil drag, and the eductor feeds this oil to the pressure pump as needed.

It is a feature of this invention that the effective size of the deaerator vent is reduced automatically with an increase in altitude, whereby to reduce the oil drag rate at high altitudes so that the pumping load on the eductor likewise will be reduced in order to cause the boost pressure at the eductor to be increased for maintaining full flow of oil at the pressure pump. This is accomplished by connecting an altitude-controlled valve in pipe 11 between the deaerator vent and the oil reservoir. As shown in Fig. 2, this valve may have a circular body 15 that is screwed into the vent opening in the top of the deaerator. The lower part of the body is provided with an axial inlet passage 16 terminating at its upper end in a valve seat 17 where the passage opens into a horizontal passage 18 through the body. A short distance above the horizontal passage the valve body is encircled by a shoulder 19, the top of which is encircled by a wide flange 20. Between the shoulder and the top of the deaerator the valve body is encircled by a coupling 21 that is provided interiorly with an annular recess 22 from which an outlet passage 23 extends radially through a threaded nipple 24. This coupling can be turned on the valve body to direct the nipple in any direction, but sealing is effected by gaskets 26 and 27 at the top and bottom of the coupling. The nipple is connected to pipe 11 leading to the reservoir. The valve body above its transverse passage 18 is provided with an axial bore in which a stem 28 is slidably mounted. The lower end of the stem is pointed to form a valve member 29 that can be moved down into the inlet passage until it engages valve seat 17.

Mounted on top of the valve body flange 20 is a circular housing 31 having a central opening in its top. Extending through this opening is an exteriorly threaded sleeve 32 that has a flange 33 at its lower end. Resting on this flange is a collar 34 which supports the top of an inverted cup 36. A nut 37 is threaded on the sleeve and presses the top of the cup against the collar, while a lock nut 38 engages the nut just mentioned. An outer nut 39 on the sleeve engages the top of the housing. Clamped between the sleeve flange and the collar above it is the upper end of a metallic bellows 41 which encircles the valve stem 28 that extends up into the sleeve. The lower end of the bellows is tightly secured to the top of a disc 42 that also encircles the valve stem and that is secured to it in sealing relation. It will be seen that as the bellows contracts and expands it will cause the disc to raise and lower the valve stem and thereby open and close the valve.

The outside of the bellows is intended to be exposed to the pressure of the atmosphere at all times, so the upper part of valve body is provided with a plurality of vertical bores 43 beside the valve stem, which connect the inside of housing 31 with valve passages 18 and 23. Those passages, in turn, communicate with the atmospheric pressure reservoir 8 through vent pipe 11. Since it is desirable that the valve remain fully open at altitudes from sea level up to about 20,000 feet, the bellows is partially evacuated so that it will not start to expand below that altitude. The air can be drawn out of the bellows up around the valve stem and out the upper end of sleeve 32, which is provided with a suitable sealing member 44 to close the passage through the sleeve after the desired amount of air has been withdrawn. Engagement of disc 42 with the bottom of cup 36 prevents the bellows from collapsing an undesirable amount at low altitudes where atmospheric pressure is greatest.

After the aircraft passes 20,000 feet, the bellows starts to expand and gradually lowers or closes valve member 29 until at 40,000 feet, for example, the valve member rests on seat 17. However, flow of air and oil drag through the valve is not stopped completely because the valve is provided with a by-pass around the valve seat. This by-pass is a fixed orifice 46 extending from the upper part of inlet passage 16 upwardly at an inclination until it opens into the recess 22 in coupling 21. This orifice therefore serves as the deaerator vent at altitudes where relatively little air must be released from the deaerator. The by-pass also has another purpose, which is to permit some flow of air from the deaerator even at low altitudes in case the valve accidentally fails to open upon descent of the airplane. In this case poor deaeration quality will result in reduced oil flow to the engine, but not in complete loss of oil flow. On the other hand, failure of the bellows to close the valve during ascent of the airplane will still permit some oil flow at altitudes as high as 40,000 feet. Thus, failure to close will limit the altitude ceiling, but will not result in total system failure.

This invention makes it possible to avoid the present compromise method of sizing the deaerator vent, and allows the sea level and high altitude oil drag rates to be adjusted to any desired value. This results in improvement in the overall performance of the lubricating system, because it provides improved deaeration at low altitudes and also improved boost pressure for the pressure pump at high altitudes. Another advantage is that there can be a more accurate selection of the eductor, due to eliminating the uncontrolled increase in make-up rate with altitude.

A somewhat simplified valve is shown in Fig. 3, where the top of the bellows 50 is clamped by a flange 51, on the lower end of a threaded sleeve 52, against the bottom of a collar 53 engaging the inner surface of the top of a housing 54. A nut 56 on the sleeve engages the outer surface of the housing top to produce the clamping action. The lower end of the bellows is secured tightly to the top of a disc 57, the center of which supports the upper end of the valve stem 58 in a central boss 59.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The combination with a closed-circuit lubrication system for aircraft internal combustion engines having a sump, a deaerator having a vent in its top, means for pumping oil from the sump to the deaerator, an oil reservoir, means for returning oil from the deaerator and reservoir to the engine, and a conduit for conducting air and oil drag from the deaerator vent to the reservoir; of an altitude-controlled vent valve in said conduit provided with a normally open passage, a throttling valve member for said passage, and means responsive to a reduction in atmospheric pressure for moving said member toward passage-closing position.

2. The combination in accordance with claim 1, in which said valve is provided with a by-pass around the valve seat so that fluid can flow through the valve at a limited rate even if it is closed.

3. The combination with a closed circuit lubrication system for aircraft internal combustion engines having a sump, a deaerator having a vent in its top, means for pumping oil from the sump to the deaerator, an oil reservoir, an eductor for returning oil from the deaerator and reservoir to said engine, and a conduit for conducting air and oil drag from the deaerator vent to the reservoir; of a normally open altitude-controlled vent valve in said conduit comprising a valve seat, a throttling valve member normally spaced from said seat, and a partially evacuated bellows responsive to a reduction in atmospheric pressure for moving said member toward its seat.

References Cited in the file of this patent
UNITED STATES PATENTS

| | | |
|---|---|---|
| 2,403,186 | Leslie | July 2, 1946 |
| 2,482,806 | Stahn | Sept. 27, 1949 |
| 2,574,254 | Eshbaugh et al. | Nov. 6, 1951 |
| 2,619,103 | Davies et al. | Nov. 25, 1952 |
| 2,672,278 | Newcomb | Mar. 16, 1954 |